United States Patent
Makino et al.

(10) Patent No.: US 9,915,760 B2
(45) Date of Patent: Mar. 13, 2018

(54) OPTICAL MEMBER AND METHOD FOR MANUFACTURING OPTICAL MEMBER

(71) Applicant: CANON KABUSHIKI KAISHA, Tokyo (JP)

(72) Inventors: Kenji Makino, Tokyo (JP); Tomonari Nakayama, Yokohama (JP); Keiko Abe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 620 days.

(21) Appl. No.: 13/961,764

(22) Filed: Aug. 7, 2013

(65) Prior Publication Data
US 2014/0044919 A1 Feb. 13, 2014

(30) Foreign Application Priority Data
Aug. 9, 2012 (JP) .................. 2012-177084

(51) Int. Cl.
*G02B 1/115* (2015.01)
*G02B 1/111* (2015.01)
*G02B 1/118* (2015.01)

(52) U.S. Cl.
CPC ............. *G02B 1/115* (2013.01); *G02B 1/111* (2013.01); *G02B 1/118* (2013.01); *Y10T 428/24355* (2015.01)

(58) Field of Classification Search
CPC ......... G02B 1/115; G02B 1/111; G02B 1/118; Y10T 428/24355
USPC .......................................................... 428/141
See application file for complete search history.

(56) References Cited

U.S. PATENT DOCUMENTS

| | | | | |
|---|---|---|---|---|
| 4,830,879 A | * | 5/1989 | Debsikdar | B05D 5/061 136/256 |
| 2010/0247758 A1 | * | 9/2010 | Nakayama | B82Y 30/00 427/162 |
| 2011/0019277 A1 | * | 1/2011 | Sager | B29D 11/00865 359/580 |
| 2012/0305521 A1 | * | 12/2012 | Hubbard | C23C 14/086 216/13 |

FOREIGN PATENT DOCUMENTS

| | | |
|---|---|---|
| EP | 2224494 A1 | 9/2010 |
| EP | 2236462 A2 | 10/2010 |
| EP | 2390229 A1 | 11/2011 |
| JP | 9-202649 A | 8/1997 |
| JP | 2005-275372 A | 10/2005 |

* cited by examiner

*Primary Examiner* — Nathan L Van Sell
(74) *Attorney, Agent, or Firm* — Canon USA, Inc. I.P. Division

(57) ABSTRACT

An optical member includes a base material and an antireflective layer on the base material wherein the antireflective layer includes a plurality of fine protrusions on a surface thereof and a support layer for supporting the protrusions, and the support layer contains boron in an amount of $7\times10^{19}$ atoms/cm$^3$ or more and $2.5\times10^{20}$ atoms/cm$^3$ or less.

11 Claims, 8 Drawing Sheets

OPTICAL MEMBER AND METHOD FOR MANUFACTURING OPTICAL MEMBER

BACKGROUND OF THE INVENTION

Field of the Invention

The present invention relates to an optical member having a high antireflective performance in a broad region including a visible region for a base material with a low refractive index, and a method for manufacturing the optical member.

Description of the Related Art

An antireflective structure having a fine structure corresponding to those equal to or smaller than wavelengths in a visible region is known to exhibit an antireflective performance in a broad wavelength region by forming a fine structure with an appropriate pitch and an appropriate height. As a method of forming the fine structure, a film in which fine particles having a particle diameter equal to or smaller than a wavelength are dispersed is known. A method of forming the fine structure by a pattern formation by a fine processing apparatus (such as an electron ray drawing apparatus, a laser interference exposure apparatus, a semiconductor exposure apparatus, an etching apparatus) enables control of a pitch and a height, and the method is also known to be able to form the fine structure having the good antireflective performance.

In addition to the method using the fine processing apparatus, it is known to obtain an antireflective effect by growing boehmite, which is an alumina-based compound, on the base material. In this method, a film is formed by a vacuum film formation or a liquid phase method (sol gel method), and then the film is dried or burned to produce a film of aluminium oxide. Subsequently, by treating the produced aluminium oxide film with water vapor or immersing the film in hot water, boehmite is produced on its surface layer to form a fine structure, followed by making an antireflective film (see Japanese Patent Application Laid-Open No. 9-202649).

In the method of producing the boehmite on the surface layer to form the fine structure by immersing in the hot water, aluminium oxide is eluted from the surface to form the fine structure. In Japanese Patent Application Laid-Open No. 9-202649, the antireflective film is formed by forming a layer supporting the fine structure between the substrate and the fine structure so that the substrate does not influence the fine structure. In the method of forming the antireflective film using the fine structure of the aluminium compound, a reflectance due to a vertical incidence and an oblique incidence is low, and the good antireflective performance can be obtained.

In Japanese Patent Application Laid-Open No. 2005-275372, it is described that when an antireflective film is produced by the liquid phase method (sol gel method), a refractive index of a layer supporting a fine structure is controlled by mixing another metal compound in a coating solution containing an aluminium compound.

However, the antireflective performance of the antireflective film using the fine structure of the aluminium compound disclosed in Japanese Patent Application Laid-Open No. 9-202649 sensitively changes due to changes of the refractive index attributed to the pitch and the height of the fine structure. Therefore, it is required to control not only the pitch and the height of the fine structure but also the refractive index of the layer supporting the fine structure according to the refractive index of the base material, and in some cases, it is also required to provide a film made of an inorganic material or an organic material for the purpose of regulating a refractive index difference between the base material and the aluminium oxide film having the fine structure.

In the method for manufacturing the antireflective film described in Japanese Patent Application Laid-Open No. 2005-275372, the metal compound to be mixed is limited to compounds of zirconia, silica, titania and zinc oxide, and thus, it is restricted that the refractive index of the layer supporting the fine structure is reduced and the pitch and the height of the fine structure are suitably controlled. In particular, it has been required to obtain the good antireflective performance for the base material having the low refractive index.

SUMMARY OF THE INVENTION

The present invention is directed to an optical member including protrusions made mainly of aluminium oxide and a porous aluminium oxide layer as a layer supporting the protrusions, and a method for manufacturing the optical member.

According to an aspect of the present invention, an optical member includes a base material and an antireflective layer on the base material, wherein the antireflective layer includes a plurality of fine protrusions on a surface thereof and a support layer for supporting the protrusions, and the support layer contains boron in an amount of $7 \times 10^{19}$ atoms/$cm^3$ or more and $2.5 \times 10^{20}$ atoms/$cm^3$ or less.

According to another aspect of the present invention, a method for manufacturing an optical member that includes a base material and an antireflective layer including protrusions and a support layer for supporting the protrusions on the base material, includes forming a layer made mainly of aluminium oxide by applying, on a surface of the base material, a coating solution containing an aluminium compound and a boron compound at a ratio of 1:0.02 to 1:0.20 that is a mass ratio of a mass of the aluminium compound in terms of aluminium to a mass of the boron compound in terms of boron, and forming the antireflective layer including a plurality of fine protrusions on a surface thereof and a layer for supporting the protrusions by treating the layer with hot water at temperature of 60° C. or above and 100° C. or below or an aqueous medium at temperature of 60° C. or above and 100° C. or below.

Further features of the present invention will become apparent from the following description of exemplary embodiments with reference to the attached drawings.

DESCRIPTION OF THE EMBODIMENTS

Figure 1:
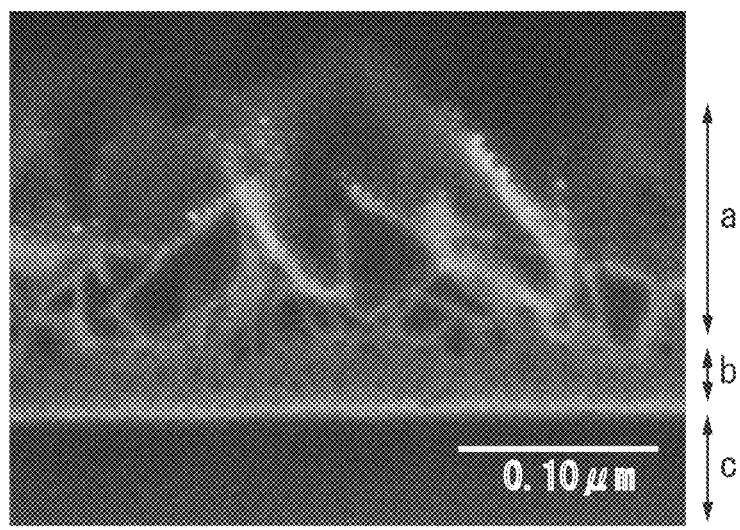
FIG. 1 is a cross-sectional photograph (magnification: 20,000 times) of an optical member captured by a scanning electron microscope (SEM) according to an exemplary embodiment of the present invention.

Hereinafter, an exemplary embodiment of the present invention will be described in detail.

An optical member according to the present exemplary embodiment includes a base material and an antireflective layer including a plurality of fine protrusions on its surface. The antireflective layer also contains boron. The optical member in the present exemplary embodiment can exert a high antireflective performance in a broad region including a visible region for the base material with a low refractive index.

(Base Material)

Glasses and plastics can be used as the base material to be used in the present exemplary embodiment. Representative plastics that compose the base material include thermoplastic resins such as polyester, triacetylcellulose, cellulose acetate, polyethylene terephthalate, polypropylene, polystyrene, polycarbonate, polymethyl methacrylate, ABS resins, polyphenylene oxide, polyurethane, polyethylene, and polyvinyl chloride; and thermosetting resins such as unsaturated polyester resins, phenol resins, crosslinked polyurethane, crosslinked acryl resins, and crosslinked saturated polyester resins. A molded article such as a lens, or a film can also be used as the base material. It is desirable to use the glass as the base material in terms of transparency and moldability.

The antireflective layer according to the present exemplary embodiment can exert the excellent antireflective performance also for the base material with a low refractive index. Thus, the base material having the refractive index $n_d$ of 1.48 or more and 1.71 or less can be used.

(Antireflective Layer)

The antireflective layer according to the present exemplary embodiment has a plurality of fine protrusions on its surface and contains boron.

An apparent refractive index in the antireflective layer is desirably changed in a thickness direction. That is, it is desirable that the refractive index be changed from the surface of the antireflective layer toward the base material. The antireflective layer also desirably has the apparent refractive index that is lower than the refractive index inherent to aluminium oxide. The antireflective layer including such a configuration can exert the better antireflective performance.

An average surface roughness Ra' in the antireflective layer is desirably 15 nm or more and 100 nm or less, and more desirably 18 nm or more and 25 nm or less. When the average surface roughness Ra' is less than 15 nm, the antireflective performance is reduced. When the average surface roughness Ra' is more than 100 nm, scattering in the antireflective layer tends to increase. A surface area ratio Sr of the antireflective layer is desirably 1.2 or more and 3.5 or less.

The average surface roughness Ra' in the antireflective layer can be measured using a scanning probe microscope (SPM). That is, an average surface roughness Ra' value (nm) is obtained by applying a centerline average roughness Ra defined in JIS B 0601 to a measuring surface and extending it to a three dimensions, represented by a "value obtained by averaging absolute values of deviations from a reference surface to a designated surface", and given by the following formula (3):

$$Ra' = \frac{1}{S_o} \int_{Y_B}^{Y_T} \int_{X_D}^{X_R} |F(X,Y) - Z_o| dx\, dy \quad (3)$$

Ra': Average surface roughness (nm),
$S_0$: Area when the measuring surface is ideally flat, $|X_R - X_L| \times |Y_T - Y_B|$,
F(X,Y): Height at measured point (X,Y), X=X coordinate, Y=Y coordinate, from $X_L$ to $X_R$: Range of X coordinate on measuring surface,
From $Y_B$ to $Y_T$: Range of Y coordinate on measuring surface, and
$Z_0$: Average height in measuring surface.

The surface area ratio Sr of the antireflective layer is also obtained by the following formula (4):

$$Sr = S/S_0 \quad (4)$$

[$S_0$: area when measuring surface is ideally flat; S: actual surface area of measuring surface]. The actual surface area of the measuring surface is obtained as follows: First, the surface area is divided into micro triangles composed of the closest three data points (A, B, C), and then an area of each micro triangle ΔS is obtained by the following formula (5) using a vector product:

$$\Delta S(\Delta ABC) = [s(s-AB)(s-BC)(s-AC)] \times 0.5 \quad (5)$$

[AB, BC or AC is a length of each side, and s is defined as 0.5×(AB+BC+AC)]

The surface area S is obtained by summation of ΔS, and the surface area ratio Sr of the antireflective layer is also obtained.

(Protrusion)

It is desirable that the protrusion on the surface of the antireflective layer be made mainly of aluminium oxide. For example, the protrusion is formed from a crystal of an oxide or a hydroxide of aluminium or a hydrate thereof. Of these, the protrusion is more desirably boehmite. The oxide or the hydroxide of aluminium or the hydrate thereof is described herein as "aluminium oxide".

Figure 4:
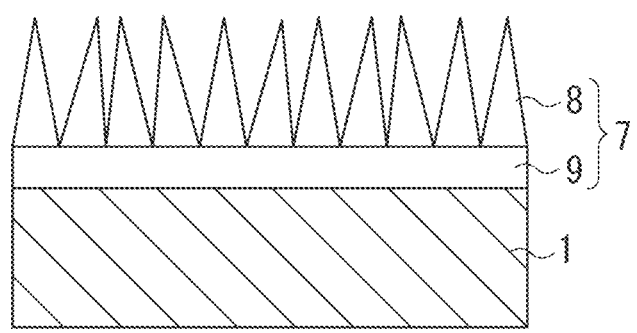
FIG. 4 is a schematic view illustrating the optical member according to the exemplary embodiment of the present invention.

In FIG. 4, a layer thickness of an antireflective layer 7 including protrusions 8 is desirably 20 nm or more and 1000 nm or less and more desirably 50 nm or more and 1000 nm or less. When the thickness of the antireflective layer 7 including the protrusions 8 is less than 20 nm, a mechanical strength is reduced, and when the thickness is more than 1000 nm, the antireflective performance is reduced.

A thickness of the protrusion 8 is desirably 5 nm or more and 50 nm or less. In the present exemplary embodiment, the "thickness of the protrusion" is defined as a value of a width at a height that is a half of a height of the protrusion. The thickness of the protrusion is obtained from a mean value of the thicknesses of 100 protrusions on an SEM photograph of the optical member.

A treatment can be given to the surface of the protrusion 8 to an extent that the antireflective performance is not impaired. The surface of the protrusion 8 can be provided with a thin film formed of $SiO_2$, a very thin film formed of fluorinated alkyl silane (FAS), or a very thin layer formed of a fluorine resin in order to impart an abrasion resistance and an antifouling property.

(Support Layer)

The optical member in the present exemplary embodiment desirably includes a support layer that supports the protrusions, between the base material and the protrusions.

A thickness of the support layer is desirably 10 nm or more and 100 nm or less. The support layer is desirably porous. The support layer is desirably made mainly of aluminium oxide and contains boron, and is more desirably formed from aluminium oxide and boron.

Figure 2:
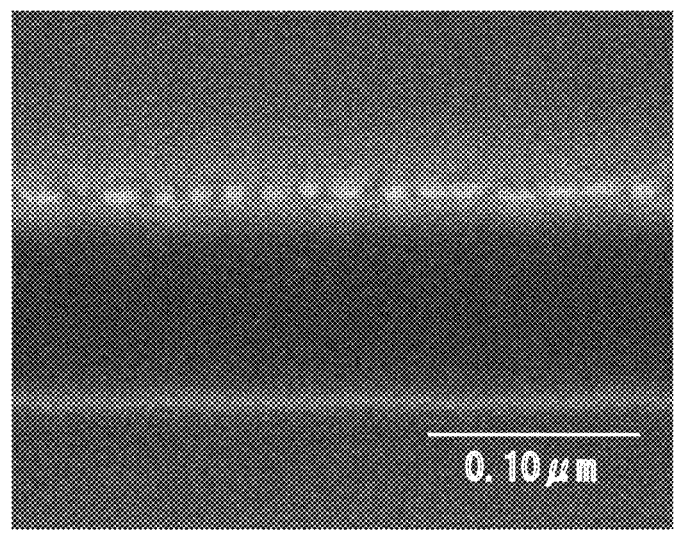
FIG. 2 is a cross-sectional photograph (magnification: 20,000 times), captured by the SEM, of an amorphous aluminium oxide film produced from a coating solution according to the exemplary embodiment of the present invention.

FIG. 2 is an SEM cross-sectional photograph of an amorphous aluminium oxide layer formed on the base material surface before being immersed into hot water to form the protrusion, in the method for manufacturing the optical member in the present exemplary embodiment. Before the amorphous aluminium oxide layer is immersed into the hot water to form the protrusion, no porous layer like the support layer that supports the protrusions in the optical member in the present exemplary embodiment is observed. That is, it is thought that a boron compound is eluted into the hot water, thereby forming the porous layer simultaneously when the amorphous aluminium oxide layer is immersed into the hot water to form the protrusions. A porosity in the cross-section of the layer that supports the protrusions is desirably 20% or more and 45% or less in the present exemplary embodiment. When the porosity exceeds 45%, the strength of the layer that supports the protrusions becomes weak and the film is sometimes peeled.

In order to examine a binding state of boron in the support layer, an aluminium compound was hydrolyzed using water containing $^{17}O$, which is a stable isotope of oxygen, and an optical member was made using an aluminum oxide sol made by mixing a boron compound. And, a binding of boron and aluminium through oxygen was analyzed from a chemical shift of $^{17}O$ by a nuclear magnetic resonance method using $^{17}O$ as a labeled element ($^{17}O$-NMR). As a result, it was confirmed that a majority did not form the binding of Al—O—B and boron remained unreacted in the support layer. This suggests that boron does not change a solubility of aluminium oxide particles in the hot water and does not inhibit the formation of boehmite that will become the protrusion when immersed in the hot water. However, it is also thought that when boron is excessively contained in the antireflective layer, a concentration of aluminium oxide in an interface between the antireflective layer and the hot water is decreased to prevent the protrusion from growing. Therefore, it is desirable to control a content of boron in the antireflective layer by an amount of boron contained in a coating solution.

When the reflective layers in which the content of boron in the support layer is different are compared, the refractive index in the amorphous aluminium oxide layer tends to decrease as the content of boron is increased. Thus, it is found that the refractive index in the layer decreases by containing boron in the support layer even if the support layer is not porous. Therefore, it is conceivable that containing boron in the support layer supporting the protrusions has an effect of further decreasing the refractive index. The support layer desirably contains boron in an amount of $7.0 \times 10^{19}$ atoms/cm$^3$ or more and $2.5 \times 10^{20}$ atoms/cm$^3$ or less. It is possible to change the refractive index in the layer supporting the protrusions by changing the porosity in the porous layer. This can change the content of boron in the support layer.

(Optical Member)

FIG. 1 is an SEM cross-sectional photograph of the optical member in the present exemplary embodiment. In FIG. 1, it is found that a portion (a) of protrusions and a portion (b) of a support layer that supports the protrusions are present. It is further found from FIG. 1 that the support layer (b) that supports the protrusions is porous.

The optical member according to the present exemplary embodiment is applicable to a transparent base material having any refractive index, and exhibits an excellent antireflective effect for visible light and has a weather resistance for a long period of time. Therefore, the optical member in the present exemplary can be utilized as optical members in various displays in word processors, computers, televisions, and plasma display panels, and can also be utilized as optical members in sunglass lenses, prescription glass lenses, finder lenses for cameras, prisms, fly-eye-lenses, toric lenses, various optical filters, and sensors formed from polarizing plates used for liquid crystal display devices, various optical glass materials, and transparent plastics. Further, the optical member in the present exemplary can also be utilized as optical members in various systems, using the above, like a photographing optical system, an observing optical system such as binoculars, and a projecting optical system such as liquid crystal projectors; various optical lenses in a scanning optical system such as laser beam printers; and covers of various instruments and window glasses of automobiles and electric trains.

Figure 7:
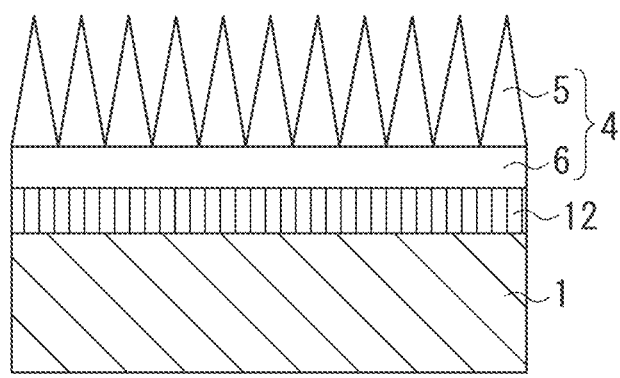
FIG. 7 is a schematic view illustrating the optical member according to the exemplary embodiment of the present invention.

As illustrated in FIG. 4, the optical member in the present exemplary embodiment can change a refractive index structure in the antireflective layer 7 including the protrusions 8 of aluminium oxide and the support layer 9 according to the refractive index in the base material by using the porous aluminium oxide film in the support layer 9. A layer made mainly of a component other than aluminium oxide can be provided between the base material 1 and the antireflective layer 7 including the protrusions 8 and the support layer 9. FIG. 7 illustrates an example of an optical member in which a layer 12 made mainly of a component other than aluminium oxide is formed on the base material 1 and further an antireflective layer 4 including protrusions 5 of aluminium oxide and a support layer 6 is formed thereon.

The layer 12 made mainly of the component other than aluminium oxide is provided mainly for the purpose of regulating a refractive index difference between the base material 1 and the antireflective layer 4 including the protrusions 5 of aluminium oxide and the support layer 6. Thus, the layer 12 made mainly of the component other than aluminium oxide is desirably a transparent layer formed from an inorganic compound or an organic compound.

Examples of the inorganic compound used for the layer 12 made mainly of the component other than aluminium oxide include metal oxides such as $SiO_2$, $TiO_2$, $ZrO_2$, $ZnO$, and $Ta_2O_3$. The layer 12 made mainly of the inorganic material other than aluminium oxide can be formed by a vacuum film forming method such as deposition or sputtering, or a sol gel method by applying a metal oxide precursor sol.

Examples of the organic compound used for the layer 12 made mainly of the component other than aluminium oxide include organic polymers such as acryl resins, epoxy resins, oxetane resins, maleimide resins, melamine resins, benzoguanamine resins, phenol resins, resol resins, polycarbonate, polyester, polyacrylate, polyether, polyurea, polyurethane, polyamide, polyamideimide, polyimide, polyketone, polysulfone, polyphenylene, polyxylylene and polycycloolefin. The layer 12 formed from the organic material can be formed by a wet coating method by mainly applying its solution.

(Method for Manufacturing Optical Member)

The method for manufacturing the optical member in the present exemplary embodiment relates to a method for manufacturing an optical member including a base material and an antireflective layer. The method for manufacturing the optical member according to the present exemplary embodiment includes a step of forming a layer made mainly of aluminium oxide and containing boron on the surface of the base material and a step of treating the formed layer made mainly of aluminium oxide in hot water at temperature of 60° C. to 100° C. or an aqueous medium at temperature of 60° C. to 100° C. to form the reflective layer including a plurality of fine protrusions on its surface.

(Step of Forming Layer Made Mainly of Aluminium Oxide)

In the step of forming the layer made mainly of aluminium oxide, the layer containing boron and made mainly of aluminium oxide is formed on the surface of the base material.

Specifically, a first solution is prepared by mixing a solvent and an aluminium compound. A second solution is prepared by mixing the resulting first solution with an aqueous medium to hydrolyze the aluminium compound. Subsequently, the resulting second solution is mixed with a boron compound to prepare a coating solution for forming the antireflective layer. The resulting coating solution is applied onto the surface of the base material to form a layer (coating film) on the surface of the base material.

The solvent used in the first solution can be an organic solvent in which a raw material such as the aluminium compound is uniformly dissolved and its particles do not agglutinate. Examples thereof include monovalent alcohols such as methanol, ethanol, 1-propanol, 2-propanol, 1-butanol, 2-butanol, 2-methylpropanol, 1-pentanol, 2-pentanol, cyclopentanol, 2-methylbutanol, 3-methylbutanol, 1-hexanol, 2-hexanol, 3-hexanol, 4-methyl-2-pentanol, 2-methyl-1-pentanol, 2-ethylbutanol, 2,4-dimethyl-3-pentanol, 3-ethylbutanol, 1-heptanol, 2-heptanol, 1-octanol, and 2-octanol; bivalent or higher valent alcohols such as ethylene glycol, and triethylene glycol; ether alcohols such methoxyethanol, ethoxyethanol, propoxyethanol, isopropoxyethanol, butoxyethanol, 1-methoxy-2-propanol, 1-ethoxy-2-propanol, and 1-propoxy-2-propanol; ethers such as dimethoxyethane, diglyme, tetrahydrofuran, dioxane, diisopropyl ether, and cyclopentylmethyl ether; esters such as methyl formate, ethyl acetate, n-butyl acetate, ethylene glycol monomethyl ether acetate, ethylene glycol monoethyl ether acetate, ethylene glycol monobutyl ether acetate, and propylene glycol monomethyl ether acetate; aliphatic or alicyclic hydrocarbons such as n-hexane, n-octane, cyclohexane, cyclopentane, and cyclooctene; aromatic hydrocarbons such as toluene, xylene, and ethyl benzene; ketones such as acetone, methyl ethyl ketone, methyl isobutyl ketone, and cyclohexanone; chlorinated hydrocarbons such as chloroform, methylene chloride, carbon tetrachloride, and tetrachloroethane; and aprotic polar solvents such as N-methylpyrrolidone, N,N-dimethylformamide, N,N-dimethylacetamide, and ethylene carbonate. Among these solvents, monovalent alcohols having 5 or more and 8 or less carbon atoms are desirable in terms of high solubility of the aluminium compound and difficult moisture absorption. The monovalent alcohol having 5 or more and 8 or less carbon atoms is highly hydrophobic and cannot be mixed uniformly with water required for hydrolysis, and it is difficult to make particle diameters constant. Thus, when the monovalent alcohol having 5 or more and 8 or less carbon atoms is used for the solvent used in the first solution, it is desirable to combine with a water-soluble solvent. The water-soluble solvent refers to a solvent in which water is soluble at 80% by mass or more at temperature of 23° C.

The aluminium compound used in the first solution is desirably an aluminium alkoxide or aluminium salt compound. More specifically, the aluminium compound is desirably a compound selected from the group consisting of aluminium ethoxide, aluminium isopropoxide, aluminium-n-butoxide, aluminium-sec-butoxide, aluminium-tert-butoxide, aluminium acetyl acetonate or oligomers thereof, aluminium nitrate, aluminium chloride, aluminium acetate, aluminium phosphate, aluminium sulfate, and aluminium hydroxide. Among these aluminium compounds, it is more desirable to use metal alkoxide such as aluminium-n-butoxide and aluminium-sec-butoxide as a raw material. Aluminium alkoxide is highly reactive with water and rapidly hydrolyzed by water in air or the addition of water to produce a cloudy solution or a precipitation. The aluminium salt compound is difficult to be dissolved in the organic solvent alone, and its solution is poorly stable. To prevent this, it is desirable to add a stabilizer to stabilize the solution.

The stabilizer used in the first solution is desirably a β-diketone compound or a β-ketoester compound. Of these, the β-diketone compound having a hydrogen atom, a halogen atom, an alkyl group having 1 or more and 6 or less carbon atoms, a perfluoroalkyl group, an allyl group, or an aryl group at position α is more desirable. It is more desirable to use the β-diketone compound having an alkyl group having 1 or more and 6 or less carbon atoms, a perfluoroalkyl group, or an allyl group at position γ. Such a stabilizer can include β-diketone compounds such as dipivaloylmethane, trifluoroacetylacetone, hexafluoroacetylacetone, benzoylacetone, and dibenzoylmethane; β-ketoester compounds such as methyl acetoacetate, ethyl acetoacetate, allyl acetoacetate, benzyl acetoacetate, iso-propyl acetoacetate, tert-butyl acetoacetate, iso-butyl acetoacetate, 2-methoxyethyl acetoacetate, and methyl 3-keto-n-valerate; alkanol amines such as monoethanolamine, diethanolamine, and triethanolamine. More specifically, the stabilizer can include acetylacetone, 3-methyl-2,4-pentanedione, 3-ethyl-2,4-pentanedione, 3-butyl-2,4-pentanedione, 3-pentyl-2,4-pentanedione, 3-hexyl-2,4-pentanedione, 3-isopropyl-2,4-pentanedione, 3-isobutyl-2,4-pentanedione, 3-isopentyl-2,4-pentanedione, 3-isohexyl-2,4-pentanedione, 3-phenyl-2,4-pentanedione, 3-chloroacetylacetone, 2,6-dimethyl-3,5-heptanedione, and 2,6-dimethyl-3,5-heptanedione.

In the preparation of the second solution, the second solution is obtained by mixing the first solution with the aqueous medium to hydrolyze the aluminium compound.

In the aqueous medium, water is contained in an amount of 0.5% by mass or more and 20% by mass or less and desirably 1% by mass or more and 10% by mass or less. A catalyst can also be added in the water for the purpose of facilitating a part of a hydrolytic reaction. As the catalyst, it is desirable to use an acid such as a hydrochloric acid or a phosphoric acid or a basic catalyst at a concentration of 0.1 mol/L or less.

A shape of a particle obtained by hydrolyzing the aluminium compound can be controlled by adding the acid or the basic catalyst. It is also desirable to contain an acid or a base in an amount of 0.001% by mass or more and less than 0.06% by mass in the second solution because the stability of the aluminium compound in the second solution is further enhanced.

To advance the hydrolysis of the aluminium compound and easily make a linkage between the aluminium compounds, the second solution may be heated at 50° C. or above and 120° C. or below for one hour or more and 3 hours or less.

The resulting second solution is mixed with the boron compound to obtain the coating solution for forming the antireflective layer. The boron compound is desirably an alkoxy boron compound. The alkoxy boron compound is desirably a compound represented by the following formula (1) or (2):

$$B(OR)_3 \quad (1)$$

[In the formula (1), R represents an alkyl group having one or more and 10 or less carbon atoms.]

$$B_3O_3(OR)_3 \quad (2)$$

[In the formula (2), R represents an alkyl group having one or more and 10 or less carbon atoms.]

Among the alkoxy boron compounds represented by the general formula (1) and (2), it is desirable to use a compound selected from the group consisting of boric acid, trimethyl borate, triethyl borate, tributyl borate, n-octyl borate, tridecyl borate, tritetradecyl borate, triisopropyl borate, tris(hexafluoroisopropyl) borate, trimethoxycyclotriboroxane, triphenyl borate, tri-o-tolyl borate, and tris(trimethylsilyl) borate.

The coating solution desirably contains the aluminium compound and the boron compound at a ratio of 1:0.02 to 1:0.20 that is a mass ratio of a mass of the aluminium compound in terms of aluminium to a mass of the boron compound in terms of boron.

Figure 3A:
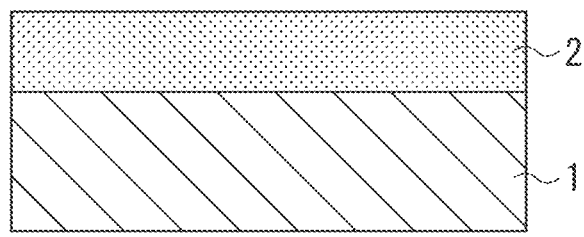
FIGS. 3A, 3B and 3C are views illustrating a method for manufacturing of the optical member according to the exemplary embodiment of the present invention.

The resulting coating solution is applied onto the surface of the base material to form a layer (coating film) on the surface of the base material. The process is described with reference to FIGS. 3A, 3B and 3C. In FIG. 3A, when a coating solution 2 is applied, the coating solution may be spread on the base material 1 after the coating solution is given on the base material 1. A method of dropping the coating solution from a narrow tube or one or a plurality of micropores is available as a method of imparting the coating solution onto the base material. A method of applying the coating solution onto the base material through a slit or a method of once applying the coating solution onto a plate and then transferring the solution onto the base material 1 are also included. The coating solution can be imparted onto the base material 1 by immersing the base material 1 in the coating solution 2. The method of spreading the coating solution on the base material includes a spin coating method in which the imparted coating solution is spread by rotating the base material 1, and a blade coating method and a roll coating method in which the dropped coating solution 2 is spread by moving a blade or a roll on the base material. It is also possible to spread the coating solution while the coating solution is imparted. It is also possible to use a slit coating method in which while the coating solution 2 is supplied from the slit, the coating solution is spread by moving the slit or the base material 1 or a printing method in which the coating solution 2 once applied onto the plate is transferred onto the base material 1 while the plate or the base material 1 is moved. Further, a dip coating method in which the base material 1 is once immersed in the coating solution 2 and then drawn up at an equal speed can also be used. When an optical member having a conformationally complex shape such as a concave surface is manufactured, it is desirable to use the spin coating method because it is difficult to closely situate a source of the coating solution 2.

The base material is desirably the glass. The refractive index $n_d$ in the base material is desirably 1.48 or more and 1.71 or less.

Figure 3B:
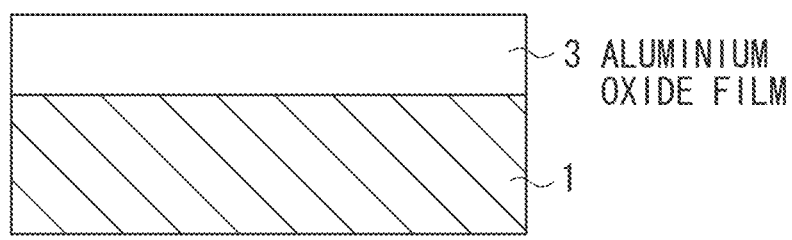

In FIG. 3B, the coating film is dried to form a layer 3 made mainly of aluminium oxide and boron on the base material. When the coating film is heated, the solvent in the coating film is volatilized. When it is further heated, a condensation reaction of unreacted alkoxide and hydroxyl groups progresses. A heating temperature is desirably 120° C. or above and 200° C. or below. When the heating temperature is lower than 120° C., the solvent becomes difficult to be volatilized. When the temperature exceeds 200° C., an effect on the base material is increased. A method of heating in a hot wind circulation oven, a muffle furnace, or an IH furnace, or a method of heating with an IR lamp can be used as a heating method.

(Step of Forming Antireflective Layer)

In the step of forming the antireflective layer, the formed layer is treated in the hot water at 60° C. or above and 100° C. or below or in the aqueous medium at 60° C. or above and 100° C. or below to form the antireflective layer including a plurality of fine protrusions on its surface.

Figure 3C:
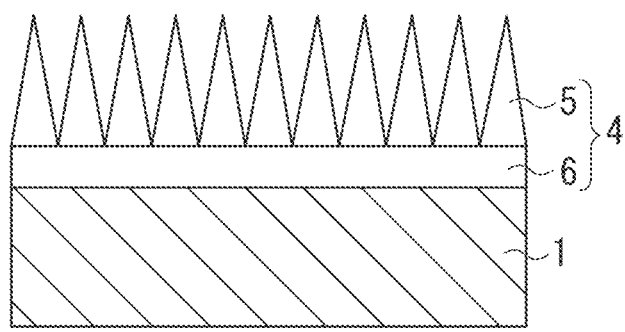

In FIG. 3C, a method of treating the layer 3 made mainly of aluminium oxide in the aqueous medium includes a method of immersing the base material 1 in the hot water and a method of contacting flowing or misty hot water with the layer 3 made mainly of aluminium oxide. The protrusion 5 is desirably formed from a crystal layer formed from a crystal made mainly of aluminium oxide and a support layer 6 of porous aluminium oxide.

Concerning the optical member produced by the method for manufacturing the optical member in the present exemplary embodiment, a schematic cross-sectional view of one exemplary embodiment is illustrated in FIG. 4. An antireflective layer 7 is formed on a base material 1 in the optical member. The antireflective layer 7 is formed from protrusions 8 and a support layer 9 that supports the protrusions.

Crystals in various sizes are randomly positioned in the antireflective layer 7, and the top portions thereof form the protrusions 8. A height, a size, an angle of the protrusion 8, and an interval between the protrusions can be altered by controlling precipitation and growth of the crystals.

Figure 5:
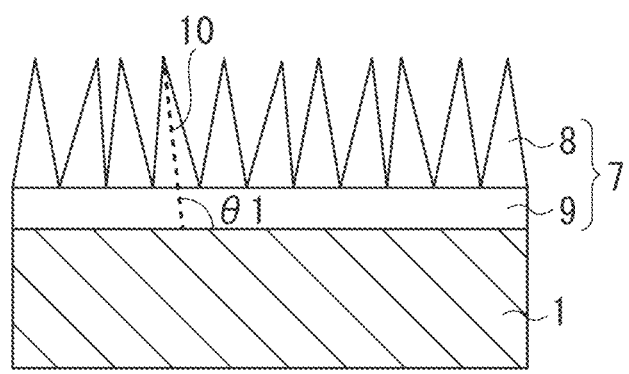
FIG. 5 is a schematic view illustrating the optical member according to the exemplary embodiment of the present invention.

An exemplary embodiment in which the surface of the base material 1 is flat such as a flat plate, a film and a sheet is illustrated in FIG. 5. The protrusion is desirably arranged so that an angle θ1 made between a tilt direction of the protrusion 8 and the surface of the base material is 45° or more and 90° or less and more desirably 60° or more and 90° or less.

Figure 6:
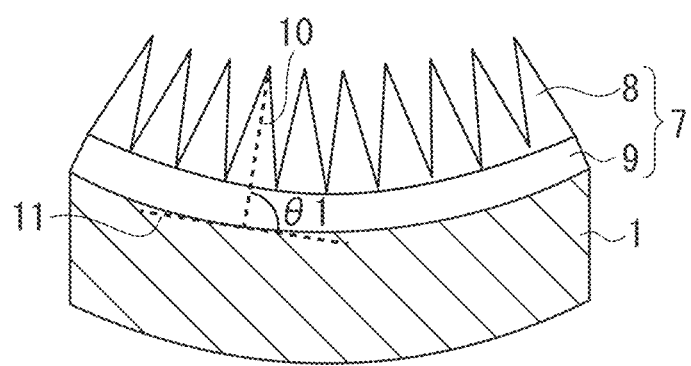
FIG. 6 is a schematic view illustrating the optical member according to the exemplary embodiment of the present invention.

A case where the base material has a two-dimensionally or three-dimensionally curved surface is illustrated in FIG. 6. The protrusion is desirably arranged so that an angle θ2 made between the tilt direction 10 and a tangent line 11 of the surface of the base material is 45° or more and 90° or less and more desirably 60° or more and 90° or less. Values of the above angles θ1 and θ2 sometimes exceed 90° according to the tilt of the protrusion 8. In this case, an angle at an sharp angle side is measured.

The protrusion 5 is formed from the crystal of an oxide or a hydroxide of aluminium or a hydrate thereof. The protrusion 5 is desirably a boehmite crystal. The support layer 6 is desirably made mainly of aluminium oxide and contains boron.

The optical member including the antireflective layer desirably meets the conditions described in the above optical member.

Hereinafter, the exemplary embodiment of the present invention will be specifically described with examples. But, the present exemplary embodiment is not limited to such examples. Optical films including protrusions on its surface obtained in each example and comparative example were evaluated by following methods.

(1) Preparation of Coating Solutions 1 to 12

24 g of aluminium-sec-butoxide (ASBD, manufactured by Kawaken Fine Chemicals Co., Ltd.) and 3-methyl-2,4-pentanedione (stabilizer) and 2-ethylbutanol in amounts of 0.5 equivalent based on ASBD were mixed and stirred until they became uniform. 0.01M diluted hydrochloric acid in an amount of 1.5 equivalents based on aluminium-sec-butoxide was dissolved in a mixed solvent of 2-ethylbutanol/1-ethoxy-2-propanol, and then the resulting solution was slowly added to the solution of aluminium-sec-butoxide, and the mixture was stirred for 60 minutes. The solvents were adjusted so that a mixed ratio of 2-ethylbutanol and 1-ethoxy-2-propanol was finally a mass ratio of 7:3. The mixture was further stirred for 2 hours in an oil bath heated at temperature of 110° C. Subsequently, a boron compound described in Table 1 was added as an additive to prepare coating solutions 1 to 11. Using silica alkoxide in place of the boron compound, a coating solution 12 was prepared by mixing the aluminium compound and tetraethoxysilane at a ratio (molar ratio) of 1:0.29, which was a ratio of an amount of the aluminium compound in terms of aluminium to an amount of tetraethoxysilane in terms of silicon in the coating solution. The stabilizer, the additive used for the preparation, and the mass ratio of aluminium to boron in the coating solution were illustrated in Table 1. In Table 1, the mass ratio of aluminium to boron represents the ratio of the mass of aluminium compound in terms of aluminium to the mass of the boron compound in terms of boron in the coating solution. In Table 1, a symbol "-" indicates that boron is not contained in the mass ratio of aluminium to boron.

(2) Washing of Base Material

A disc-shaped glass base material, one side of which was polished and the other side was a ground glass, having a diameter of about 30 mm and a thickness of about 1 mm, was washed with sonication in an alkaline detergent, then dried in an oven, and used.

(3) Measurement of Reflectance

A reflectance at an incident angle of 0° in the range of 400 nm to 700 nm was measured using a microscope spectrometer (USPM-RU manufactured by Olympus Corporation). A mean value of the reflectances in the measured range, a mean value of the reflectance in the range of 530 nm to 570 nm that was a region in which a relative luminous efficiency was high, and a minimum reflectance in the measured range were obtained.

(4) Measurement of Content of Boron in Support Layer

An antireflective layer was formed on a disc-shaped Si base material having a diameter of about 30 mm and a thickness of about 0.5 mm, and sputtered from a backside in order to avoid an effect from a protrusion structure on the surface. Then, a content of boron in the support layer was measured using a secondary ionic mass spectrometry (ATO-MIKA 4500). A detection area was 30 μm×60 μm, $O_2^+$ was used as a primary ion species, and a primary acceleration voltage was 5.0 kV.

(5) Porosity of Cross-Section

An aluminium oxide portion and a porous portion in the support layer that supported the protrusions were binarized on an SEM cross-sectional, observational photograph of the support layer, using image processing software (ImageJ). A porosity was obtained from a percentage of the number of pixels in the porous portion in a certain site area.

(Measurement of Refractive Index)

A base material coated with an amorphous aluminium oxide film was measured using a spectro-ellipsometry (J. A. Woollam EC-400), and a refractive index at a light wavelength of 550 nm was obtained by simulation using analysis software W-VASE.

(Evaluation of Protrusion Shape)

A thickness of the protrusion was measured through cross-sectional observation, using an SEM. When the thickness was 5 nm or more and 50 nm or less, the protrusion was evaluated to be "good", and if this is not the case, it was evaluated to be "bad".

(8) Measurement of Average Surface Roughness Ra'

An average surface roughness Ra' of the protrusion structure was obtained using an atomic force microscope (SPA-400, manufactured by SII).

TABLE 1

| Coating solution | Stabilizer | Additive | Mass ratio of boron to aluminium |
|---|---|---|---|
| Coating solution 1 | 3-methyl-2,4-pentanedione | Trimethoxy cycloboroxane | 1:0.02 |
| Coating solution 2 | 3-methyl-2,4-pentanedione | Trimethoxy cycloboroxane | 1:0.04 |
| Coating solution 3 | 3-methyl-2,4-pentanedione | Trimethoxy cycloboroxane | 1:0.08 |
| Coating solution 4 | 3-methyl-2,4-pentanedione | Trimethoxy cycloboroxane | 1:0.16 |
| Coating solution 5 | 3-methyl-2,4-pentanedione | Trimethoxy cycloboroxane | 1:0.20 |
| Coating solution 6 | 3-ethyl-2,4-pentanedione | Trimethyl borate | 1:0.14 |
| Coating solution 7 | 3-ethyl-2,4-pentanedione | Tri-n-butyl borate | 1:0.32 |
| Coating solution 8 | 3-methyl-2,4-pentanedione | Tri-n-octyl borate | 1:0.55 |
| Coating solution 9 | 3-methyl-2,4-pentanedione | None | — |
| Coating solution 10 | Ethyl 3-oxobutanoic acid | None | — |
| Coating solution 11 | 3-methyl-2,4-pentanedione | Trimethoxy cycloboroxane | 1:0.32 |
| Coating solution 12 | 3-methyl-2,4-pentanedione | Tetraethoxy silane | — |

Example 1

The coating solution 1 in an appropriate amount was dropped onto a disc-shaped glass base material L-BAL42 manufactured by Ohara Inc. ($n_d$=1.583) and washed by the above method, and applied by spin coating to make a film thickness suitable for reducing the reflectance. Subsequently, the base material was treated with heat in a hot wind circulation oven at temperature of 140° C. for 30 minutes to produce the disc-shaped glass base material coated with an amorphous aluminium oxide layer. Subsequently, an optical member was manufactured by immersing the amorphous aluminium oxide layer in hot water at temperature of 75° C. to form an antireflective layer including protrusions of aluminium oxide and a support layer containing boron on the disc-shaped glass base material.

(Examples 2 to 5) (Examples 12 to 14)

An optical member was manufactured in a manner similar to that in Example 1, except that an amorphous aluminium oxide layer was formed using the coating solution 2 to 8 in place of the coating solution 1.

Example 6

An optical member was manufactured in a manner similar to that in Example 1, except that an amorphous aluminium oxide layer was formed using the coating solution 2 in place of the coating solution 1 at film-forming temperature of 120° C.

Example 7

An optical member was manufactured in a manner similar to that in Example 1, except that an amorphous aluminium oxide layer was formed using the coating solution 2 in place of the coating solution 1 at film-forming temperature of 200° C.

Example 8

An optical member was manufactured in a manner similar to that in Example 1, except that an amorphous aluminium oxide layer was formed using the coating solution 2 in place of the coating solution 1 and using a disc-shaped glass base material S-LAL8 ($n_d$=1.713) manufactured by Ohara Inc. as a base material.

Example 9

An optical member was manufactured in a manner similar to that in Example 1, except that an amorphous aluminium oxide layer was formed using the coating solution 2 in place of the coating solution 1 and using a disc-shaped glass base material S-TIM25 ($n_d$=1.673) manufactured by Ohara Inc. as a base material.

Example 10

An optical member was manufactured in a manner similar to that in Example 1, except that an amorphous aluminium oxide layer was formed using the coating solution 2 in place of the coating solution 1 and using a disc-shaped glass base material S-TIM3 ($n_d$=1.613) manufactured by Ohara Inc. as a base material.

Example 11

An optical member was manufactured in a manner similar to that in Example 1, except that an amorphous aluminium oxide layer was formed using the coating solution 2 in place of the coating solution 1 and using a disc-shaped glass base material S-FSL5 ($n_d$=1.488) manufactured by Ohara Inc. as a base material.

Example 15

A glass optical lens (diameter=34 mm, center depth=11.7 mm, angle of view=72°, $n_d$=1.583) was produced using an optical glass (L-BAL42 manufactured by Ohara Inc.). Using the coating solution 1 used in Example 1, an antireflective film was formed on the surface of the produced lens in a manner similar to that in Example 1.

Comparative Examples 1 to 4

An optical member was manufactured in a manner similar to that in Example 1, except that an amorphous aluminium oxide layer was formed using the coating solution 9 to 12 in place of the coating solution 1.

Comparative Example 5

An optical member was manufactured in a manner similar to that in Example 1, except that an amorphous aluminium oxide layer was formed using the coating solution 10 in place of the coating solution 1 at film-forming temperature of 200° C.

(Results)

Performances of the optical films (optical members) manufactured in Examples 1 to 14 and Comparative Example 1 to 5 were evaluated. Results of the evaluation are shown in Table 2. In Table 2, an average reflectance 1(%) denotes a mean value of absolute reflectances at an incident angle of 0° in the range of light wavelengths from 400 nm to 700 nm. In Table 2, an average reflectance 2(%) denotes a mean value of absolute reflectances at an incident angle of 0° in the range of the light wavelengths from 530 nm to 570 nm. In Table 2, a minimum reflectance denotes a minimum reflectance in reflectances at an incident angle of 0° in the range of the light wavelengths from 400 nm to 700 nm.

Concerning Examples 1, 5 and 13, and Comparative Example 3, a content of boron in the support layer that supported the protrusions formed of aluminium oxide was measured by the secondary ion mass spectrometry. The results are shown in Table 3. The porosity and the refractive index in the amorphous aluminium oxide film (layer) at light wavelength of 550 nm are shown in Table 3 concerning Examples 1, 5 and 13, and Comparative examples 1 and 3. In Table 3, a film refractive index ($n_{550nm}$) denotes a refractive index in the amorphous aluminium oxide film at light wavelength of 550 nm.

The protrusions present on the support layer on the disc-shaped glass base material were removed to expose the support layer in the manufactured optical member. Then, the content of boron in the support layer was measured, and a content similar to that in the case of measuring the content of boron in the support layer from an Si base material side was obtained.

It was confirmed that the lens manufactured in Example 15 and including the antireflective layer exhibited an excellent reflectance property similar to that in Example 1 and was excellent in antireflective performance.

Figure 8:
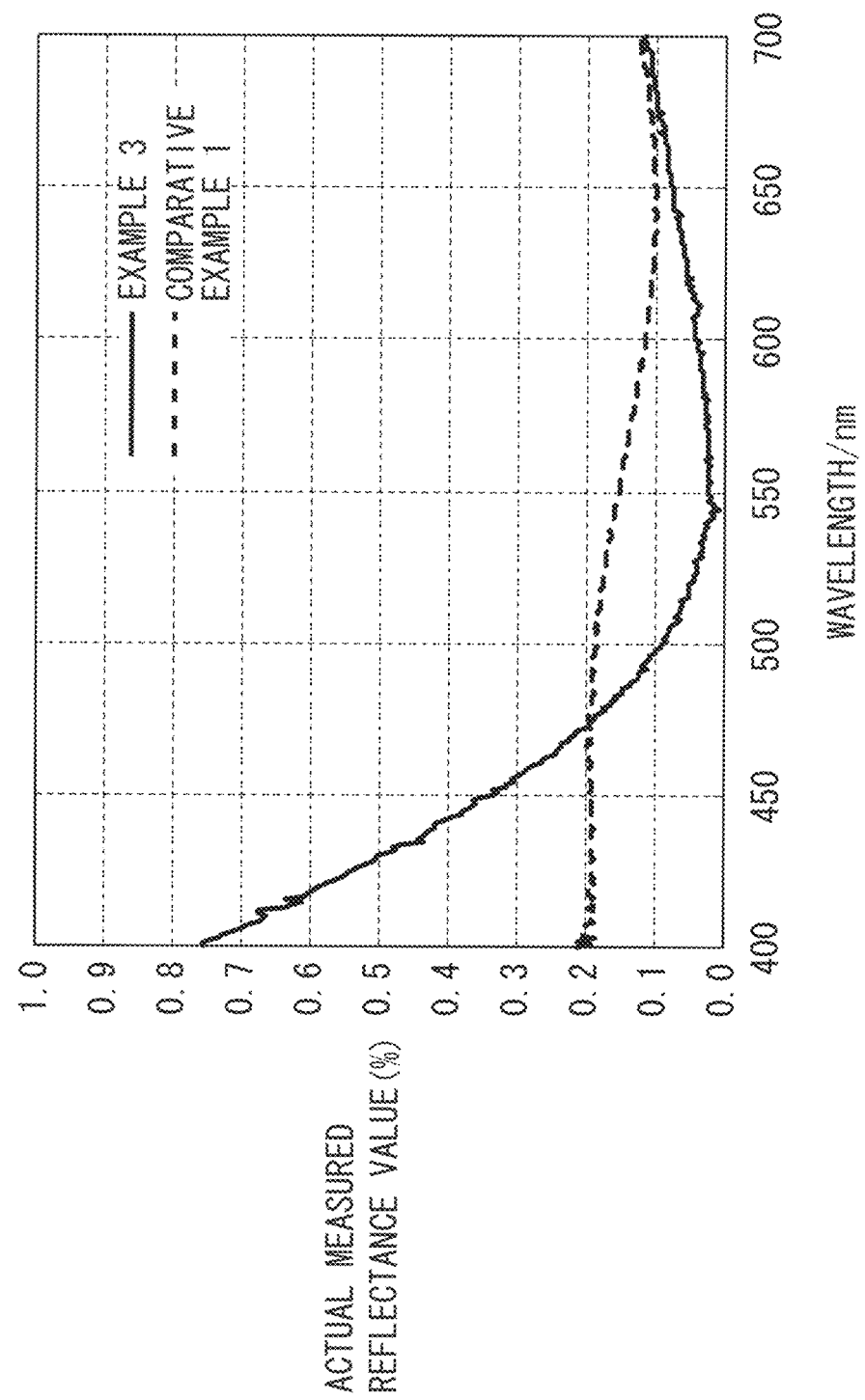
FIG. 8 is a view illustrating reflectances in an example and a comparative example.

The comparison of the reflectances in Example 3 and Comparative Example 1 is shown in FIG. 8.

TABLE 2

|  | Film forming temperature | Base material refractive index ($n_d$) | Average reflectance 1 (%) | Average reflectance 2 (%) |
| --- | --- | --- | --- | --- |
| Example 1 | 140 | 1.583 | 0.197 | 0.085 |
| Example 2 | 140 | 1.583 | 0.181 | 0.054 |
| Example 3 | 140 | 1.583 | 0.161 | 0.022 |
| Example 4 | 140 | 1.583 | 0.190 | 0.065 |
| Example 5 | 140 | 1.583 | 0.237 | 0.112 |
| Example 6 | 120 | 1.583 | 0.196 | 0.088 |
| Example 7 | 200 | 1.583 | 0.161 | 0.102 |
| Example 8 | 140 | 1.713 | 0.161 | 0.045 |
| Example 9 | 140 | 1.673 | 0.120 | 0.097 |
| Example 10 | 140 | 1.613 | 0.119 | 0.097 |
| Example 11 | 140 | 1.488 | 0.247 | 0.049 |
| Example 12 | 140 | 1.583 | 0.163 | 0.052 |
| Example 13 | 140 | 1.583 | 0.179 | 0.036 |
| Example 14 | 140 | 1.583 | 0.161 | 0.029 |
| Comparative Example 1 | 140 | 1.583 | 0.150 | 0.152 |

TABLE 2-continued

| | | | | |
|---|---|---|---|---|
| Comparative Example 2 | 140 | 1.583 | 0.248 | 0.174 |
| Comparative Example 3 | 140 | 1.583 | 1.082 | 0.952 |
| Comparative Example 4 | 140 | 1.583 | 0.224 | 0.259 |
| Comparative Example 5 | 200 | 1.583 | 0.082 | 0.153 |

| | Minimum reflectance (%) | Shape of protrusion |
|---|---|---|
| Example 1 | 0.006 | Good |
| Example 2 | 0.002 | Good |
| Example 3 | 0.008 | Good |
| Example 4 | 0.055 | Good |
| Example 5 | 0.099 | Good |
| Example 6 | 0.088 | Good |
| Example 7 | 0.098 | Good |
| Example 8 | 0.015 | Good |
| Example 9 | 0.048 | Good |
| Example 10 | 0.019 | Good |
| Example 11 | 0.025 | Good |
| Example 12 | 0.018 | Good |
| Example 13 | 0.019 | Good |
| Example 14 | 0.022 | Good |
| Comparative Example 1 | 0.098 | Good |
| Comparative Example 2 | 0.134 | Good |
| Comparative Example 3 | 0.849 | Bad |
| Comparative Example 4 | 0.135 | Good |
| Comparative Example 5 | 0.032 | Good |

TABLE 3

| | Boron content in support layer (atoms/cm$^3$) | Base material refractive index ($n_d$) | Film refractive index ($n_{550nm}$) | Ra' (nm) | Shape of protrusion |
|---|---|---|---|---|---|
| Example 1 | 7 × 10$^{19}$ | 1.583 | 1.5035 | 18 | Good |
| Example 5 | 12 × 10$^{19}$ | 1.583 | 1.4993 | 19 | Good |
| Example 13 | 25 × 10$^{19}$ | 1.583 | 1.4993 | 18 | Good |
| Comparative Example 1 | — | 1.583 | 1.5069 | 16 | Good |
| Comparative Example 3 | 30 × 10$^{19}$ | 1.583 | NM* | 26 | Bad |

*Not measurable (Evaluation)

When the average reflectances 1, the average reflectances 2 and the minimum reflectances in Examples 1 to 5 and Comparative Examples 1 to 3 and 5 were compared, it was confirmed that the optical members according to Examples exhibited the excellent reflectance property in all parameters examined. In particular, the results show excellence in mean values of the reflectances in the region of 530 nm to 570 nm in which the relative luminous efficiency was high and in minimum reflectance in the measured range. The reflectances of the optical members in Examples are distributed on a valley-like curve having a minimum value between the light wavelengths of 530 nm and 570 nm, but the reflectances of the optical members in Comparative Examples 1 to 2 and 5 are distributed on a mountain-like curve having a maximum value between 530 nm and 570 nm. For example, even if the average reflectances in the visible range of 400 nm to 700 nm are the same, the valley-like curved reflectance is low in the region of the light wavelengths of 530 nm to 570 nm in which the relative luminous efficiency is high, and thus is more desirable than the mountain-like curved reflectance.

It was also confirmed from Comparative Example 3 that when the content of boron was excessive, the layer including the protrusions could not exert the sufficient antireflective performance.

It was confirmed from the results of Examples 6 and 7 that the good antireflective property was exerted without largely depending on the film-forming temperature.

It was confirmed from the results of Examples 8 to 11 that the good antireflective property was exerted for the base material having the refractive index ($n_d$) of 1.488 to 1.713.

It was confirmed from the results of Example 3 and Comparative Example 3 that the optical member forming the porous film according to the exemplary embodiment was more excellent in reflectance property than the optical member including the film that contains the compound alone having the low refractive index.

From the results of the boron contents in the support layer supporting the protrusions made of aluminium oxide in Examples 1, 5 and 13 and Comparative Example 3, it was confirmed that although the boron content in the support layer was different depending on the type of the boron compound to be mixed, the boron content in the support layer was proportional to the boron content in the aluminium oxide sol.

From the results of the refractive index of the amorphous aluminium oxide film in Examples 1, 5 and 13 and Comparative Example 1, it was confirmed that as the content of boron was increased, the refractive index decreased. In Comparative Example 3, the materials could not be fitted in a monolayer film model, and thus the refractive index could not be obtained.

The optical member manufactured according to the present exemplary embodiment can be utilized for the optical members such as polarizing plates used for the liquid crystal display devices, various optical glass materials, spectacle lenses, and prisms.

According to the exemplary embodiment of the present invention, by including the support layer containing boron and the antireflective layer including a plurality of protrusions on the base material, it is possible to provide the optical member having the high antireflective performance for the base material with the low refractive index in the broad region including the visible region, and the method for manufacturing the optical member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-177084 filed Aug. 9, 2012, which is hereby incorporated by reference herein in its entirety.

What is claimed is:
1. An optical member comprising:
a base material; and
an antireflective layer on the base material,
wherein the antireflective layer includes a plurality of fine protrusions on a surface thereof and a support layer, disposed on the base material below the protrusions, for supporting the protrusions,
wherein the protrusions are made mainly of boehmite and wherein the support layer contains aluminum oxide and boron in an amount equal to or greater than $7 \times 10^{19}$ atoms/cm$^3$ and equal to or less than $2.5 \times 10^{20}$ atoms/cm$^3$, wherein a thickness of the support layer is 10 nm or more and 100 nm or less, and a porosity in a cross-section of the support layer is 20% or more and 45% or less, wherein the base material has a refractive index $n_d$ of 1.48 or more and 1.71 or less, and wherein a minimum reflectance of the optical member is 0.03% or less.

2. The optical member according to claim 1, wherein the antireflective layer has an apparent refractive index changing in a thickness direction, and wherein the antireflective layer has the apparent refractive index lower than a refractive index inherent to aluminium oxide.

3. The optical member according to claim 1, wherein a thickness of the protrusion is 5 nm or more and 50 nm or less.

4. The optical member according to claim 1, wherein the antireflective layer has an average surface roughness Ra' of 18 nm or more and 25 nm or less.

5. The optical member according to claim 1, wherein the base material is formed of glass.

6. An optical member comprising:
a base material; and
a layer disposed on the base material,
wherein the layer includes a plurality of protrusions on a surface thereof, and a support layer, the support layer being disposed on the base material below the protrusions, wherein the protrusions are made mainly of aluminum oxide, wherein the support layer contains aluminum oxide and boron, wherein a content of the boron in the support layer is equal to or greater than $7 \times 10^{19}$ atoms/cm$^3$ and equal to or less than $2.5 \times 10^{20}$ atoms/cm$^3$, wherein a thickness of the support layer is 10 nm or more and 100 nm or less, wherein the base material has a refractive index $n_d$ of 1.48 or more and 1.71 or less, and wherein a minimum reflectance of the optical member is 0.03% or less.

7. The optical member according to claim 6,
wherein the layer has an apparent refractive index changing in a thickness direction, and
wherein the layer has the apparent refractive index lower than a refractive index inherent to aluminium oxide.

8. The optical member according to claim 6, wherein a thickness of the protrusion is 5 nm or more and 50 nm or less.

9. The optical member according to claim 6,
wherein the layer has an average surface roughness Ra' of 18 nm or more and 25 nm or less.

10. The optical member according to claim 6, wherein the base material is formed of glass.

11. The optical member according to claim 6, wherein the protrusions are mainly made of an oxide of aluminum, a hydroxide of aluminium, a hydrate of the oxide of aluminum, or a hydrate of the hydroxide of aluminium.

* * * * *